United States Patent
Lew et al.

(10) Patent No.: US 7,802,197 B2
(45) Date of Patent: Sep. 21, 2010

(54) ADAPTIVE SYSTEMS AND METHODS FOR MAKING SOFTWARE EASY TO USE VIA SOFTWARE USAGE MINING

(75) Inventors: Sin Shyh Lew, Bellevue, WA (US); Pyungchul Kim, Sammamish, WA (US); Sanjeev Katariya, Bellevue, WA (US); Zijian Zheng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 11/112,683

(22) Filed: Apr. 22, 2005

(65) Prior Publication Data

US 2006/0242638 A1 Oct. 26, 2006

(51) Int. Cl.
G06F 3/048 (2006.01)

(52) U.S. Cl. .................. 715/789; 715/707; 715/745; 715/747; 715/810; 715/811

(58) Field of Classification Search .............. 715/788, 715/789, 707, 74, 747, 810, 811
See application file for complete search history.

(56) References Cited

U.S. PATENT DOCUMENTS

| | | | | |
|---|---|---|---|---|
| 5,420,975 | A * | 5/1995 | Blades et al. ............... | 715/811 |
| 6,014,638 | A * | 1/2000 | Burge et al. ................ | 705/27 |
| 6,121,968 | A * | 9/2000 | Arcuri et al. ............... | 715/825 |
| 6,148,294 | A * | 11/2000 | Beyda et al. ................ | 707/1 |
| 6,243,759 | B1 * | 6/2001 | Boden et al. ............... | 709/238 |
| 6,360,249 | B1 * | 3/2002 | Courts et al. .............. | 709/203 |
| 6,847,387 | B2 * | 1/2005 | Roth ............................ | 715/811 |
| 7,020,882 | B1 | 3/2006 | Lewallen | |
| 7,080,321 | B2 * | 7/2006 | Aleksander et al. ........ | 715/708 |
| 7,237,240 | B1 * | 6/2007 | Chen et al. ................. | 718/100 |
| 2002/0083093 | A1 * | 6/2002 | Goodisman et al. ........ | 707/511 |
| 2002/0174230 | A1 * | 11/2002 | Gudorf et al. ............... | 709/227 |
| 2003/0046401 | A1 * | 3/2003 | Abbott et al. ............... | 709/228 |

(Continued)

FOREIGN PATENT DOCUMENTS

WO WO 99/66394 * 12/1999

OTHER PUBLICATIONS

PCT Search Report, International Application No. PCT/US06/09758, filed Mar. 16, 2006.

*Primary Examiner*—Ba Huynh
*Assistant Examiner*—Tuyetlien T Tran
(74) *Attorney, Agent, or Firm*—Joseph R. Kelly; Westman, Champlin & Kelly, P.A.

(57) ABSTRACT

A system for dynamically updating user accessible features of a software application on a client computer has a user interface, a local usage data file, and a data mining engine. The user interface is adapted to receive operator inputs. The local usage data file is adapted to store usage information corresponding to the operator inputs. The data mining engine is adapted to process the stored usage information and to generate local adjustments to a user interface of the software application based on the operator inputs. In one embodiment, a server is adapted to receive usage data from a plurality of application instances on a plurality of client computers and to generate global adjustments based on the received usage data. In one embodiment, the system has a merge feature adapted to blend and resolve conflicts between local and global adjustments to generate an interface adjustment for the user interface.

18 Claims, 7 Drawing Sheets

U.S. PATENT DOCUMENTS

2003/0142139 A1* 7/2003 Brown et al. .............. 345/800
2004/0165008 A1* 8/2004 Levine et al. ............. 345/789
2005/0044508 A1* 2/2005 Stockton ................. 715/811

* cited by examiner

ADAPTIVE SYSTEMS AND METHODS FOR MAKING SOFTWARE EASY TO USE VIA SOFTWARE USAGE MINING

BACKGROUND OF THE INVENTION

The present invention relates to user interface for software applications, and more particularly, to systems and methods for dynamic, adaptive modification of the user interface based on usage.

Generally, when a developer designs and codes a software application, the developer writes code to implement functionality according to design specifications and designs a user interface that is organized according to the designer's perception of how users will interact with the application. The arrangement of menus and of menu items and the overall layout are largely based upon the designer's decisions. Additionally, the relative ease with which certain functions are accessed by a user is determined in large part by the same design decisions.

Unfortunately, a software designer cannot always anticipate the frequency with which users will access particular features of an application. Additionally, each user has different software needs and can make use of different functionality within the software application depending on those specific needs. To the extent that software developers hope to improve on subsequent versions of an application, it would be useful to have feedback with respect to how a particular application is used across a large population of users. Unfortunately, it is often difficult to collect feedback from users, in part, because many users lack the time and the desire for responding to survey-type information gathering efforts.

There is an ongoing need in software application design for application usage feedback. Additionally, there is an ongoing need in software design for streamlined and/or more efficient implementations of software applications geared toward particular users. Embodiments of the present invention provide solutions to these problems and other advantages over the prior art.

SUMMARY OF THE INVENTION

A system for dynamically updating user accessible features of a software application on a client computer is provided. The system has a user interface, a local usage data file, and a data mining engine. The user interface is adapted to receive operator inputs. The local usage data file is adapted to store usage information corresponding to the operator inputs. The data mining engine is adapted to process the stored usage information and to generate local adjustments to a user interface of the software application based on the operator inputs.

In one embodiment, a system for updating a user interface of a software application based on global usage data includes a server, a global usage log, and a data mining engine. The server is coupled to a network and is adapted to receive usage information over the network based on operator interactions with the user interface of each of a plurality of application instances of the software application. The global usage log stores the received usage information. The data mining engine is adapted to process the stored usage information and to generate global adjustments to the user interface of each of the plurality of application instances based on the stored usage information.

In another embodiment, a system for dynamically improving a user interface of a software application includes client devices, a server, and a merge feature. The client devices are coupled to a network and are adapted to operate software programs. Each client device has a software application with a user interface. The software application is adapted to record operator interactions with the user interface and optionally to generate a usage output based on the recorded operator interactions. Each client device is adapted to generate local adjustments to the user interface based on the recorded operator interactions. The server is coupled to each of the client devices over the network and is adapted to receive the usage output from the client devices. The server is adapted to process the received usage output and to generate global updates to the user interface based on the received usage output. The merge feature on each client device is adapted to receive the global updates and to merge the global updates with the local adjustments to update the user interface.

DETAILED DESCRIPTION OF ILLUSTRATIVE EMBODIMENTS

Figure 1:
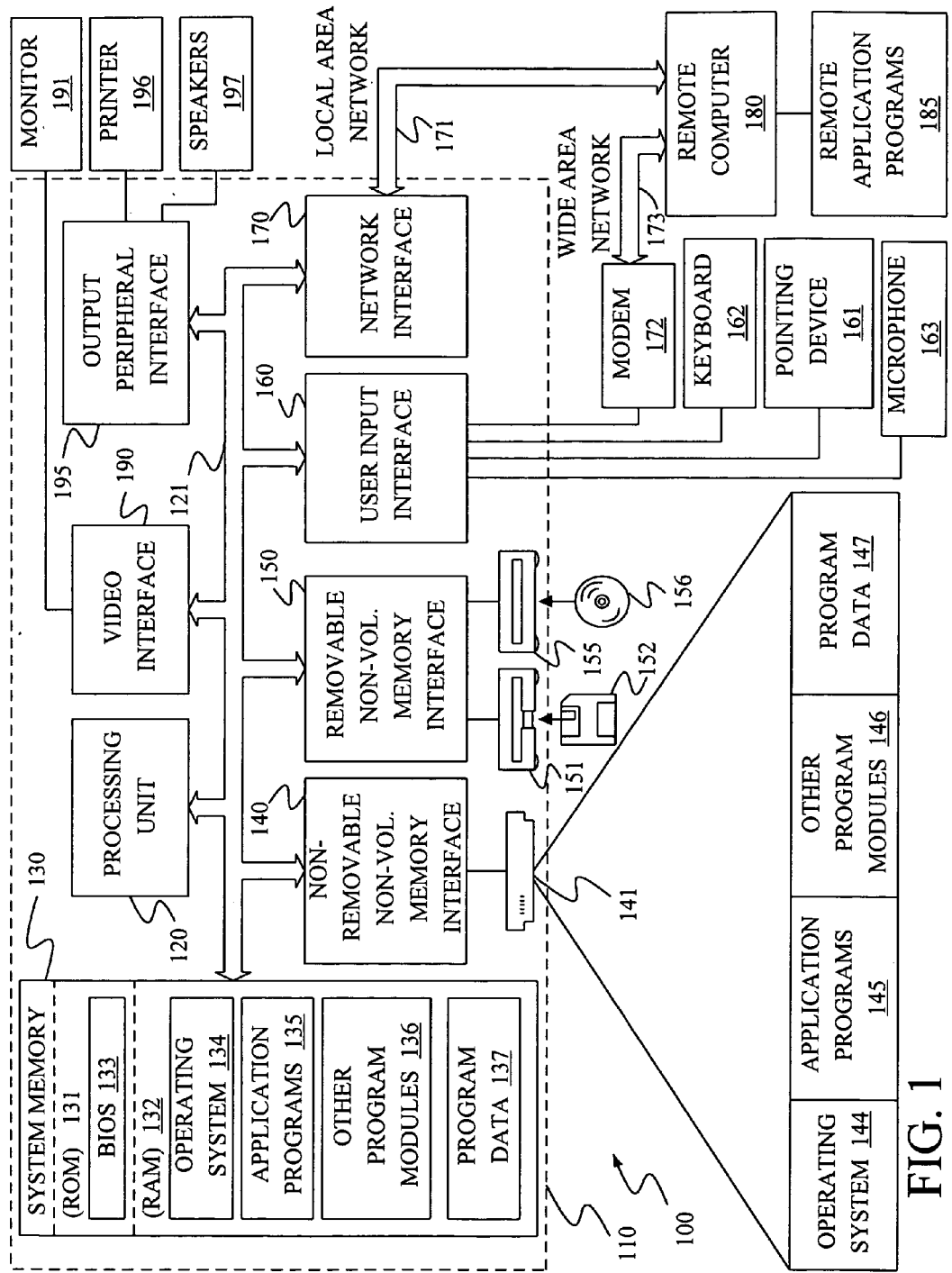
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, and the like that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
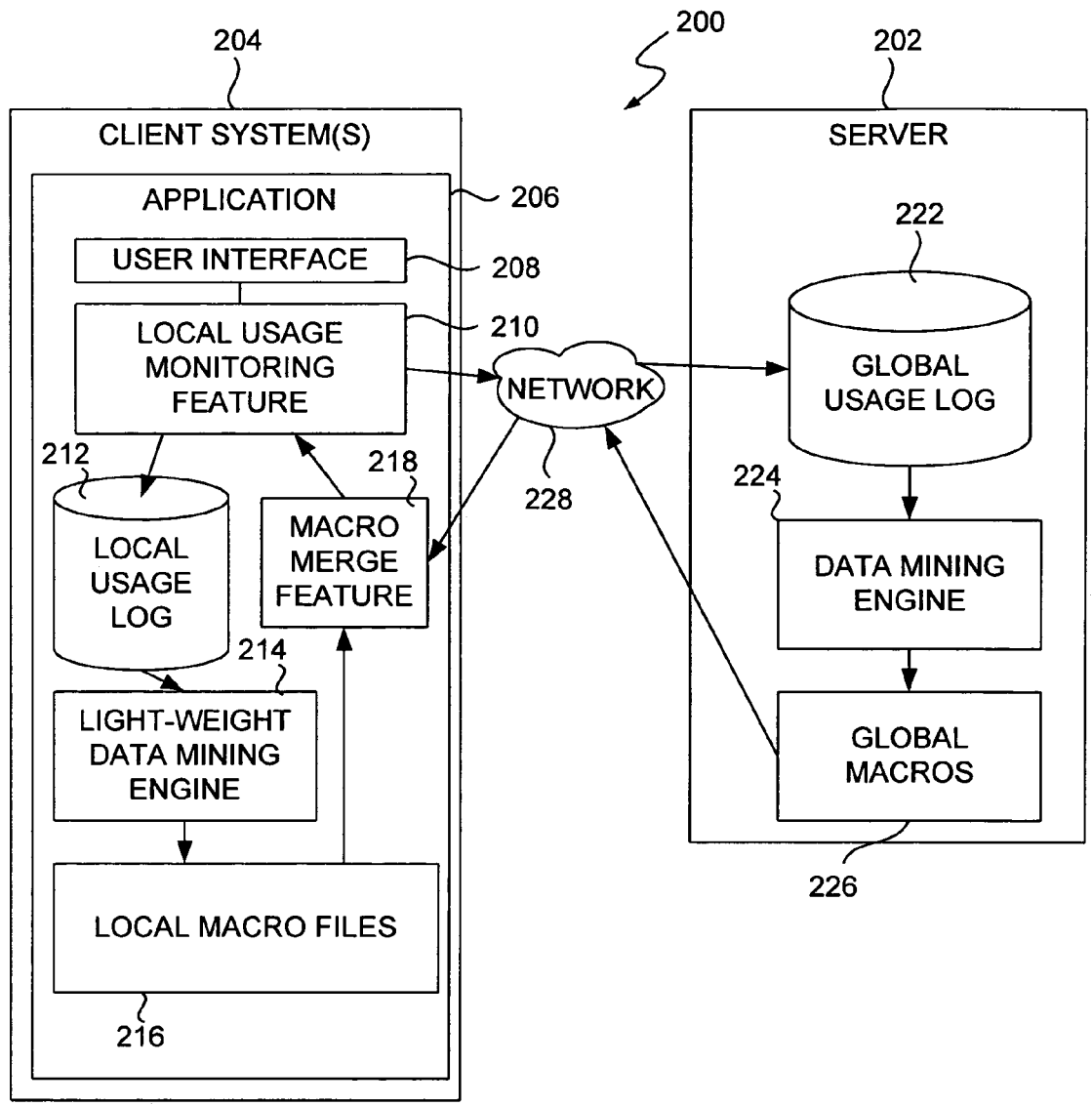
FIG. 2 is a simplified block diagram of a system for adaptive modification of a user interface of a software application based on operator usage of the application according to an embodiment of the present invention.

FIG. 2 is a simplified block diagram of a system 200 adapted to mine usage data according to an embodiment of the present invention. The system 200 includes a server 202 and one or more client machines 204 coupled by a network 228, which may be a local area network or a wide-area network, such as the Internet. Each client machine 204 includes a software application 206 with a user interface (UI) 208 and a local usage feature 210, a local usage log 212, a light-weight data mining engine 214, a local macros file 216, and a macro merging feature 218. The server 202 includes a global usage log 220, a data mining engine 222, and global macros 224.

In general, the software application 206 is adapted to monitor user interactions with the UI 208 and to record usage information associated with the user interactions within the local usage log 212. Usage information, for example, can include a count of the number of times the user accesses particular functions or features of the application 206 through the UI 208, a count of the number of times a user accesses a particular UI object (such as a tool bar, a button and the like), or other usage information. When the size of the local usage log 212 reaches a predetermined value and the client system 204 is not busy, the light-weight data mining engine 214 accesses the local usage log 216, analyzes the data using any desired data mining technique, and updates local macros and/or modifies objects within the UI 208 to adapt the UI 208 of the software application 206 to fit the user's pattern of use. The local macros can thereby minimize the number of steps required for a user to finish his/her frequent tasks. For example, if access to a particular function or feature of the software application 206 requires a series of user clicks with the mouse or a series of user selections, the lightweight data mining engine 214 can generate a local macro 216 that makes the particular function or feature accessible by a single click for the user. In this manner, local macros 216 can be automatically created to improve the efficiency of the user's interaction with the application 206. Additionally, the lightweight data mining engine 214 can determine that certain functions or features have not been used or have been used rarely while other features are selected often, and adjust the UI 208 to make the more frequently accessed objects easier to access. For example, menu items listed within menus in the UI 208 of the software application 206 can be rearranged to fit a user's pattern of use, thereby making the user's interaction with the UI 208 more efficient.

The server 202 includes an input 220, a global usage log 222, a global data mining engine 224, and global macros and/or UI adjustments 226. The server 202 is adapted to collect usage data from local usage log 216 of one or more client systems 204 through the input 220 and to store the collected usage data in the global usage log 222. Periodically (on a predetermined interval), the global data mining engine 224 accesses the global usage log 222 to identify global usage preferences and usage patterns and to generate global macros and/or UI adjustments 226 to incorporate global patterns of use for the software application 206 across a large population of users. The global macros are updated to minimize the steps many users need to finish their most common, frequently accessed tasks.

For example, if a print feature of the software application 206 is used more than any other feature of the application, a global macro 226 can be created to make the print function easier to access for all users. Periodically, or upon initiation by the user, the client system 204 can communicate with the server 202 (over a network 228, for example) and download the global macro 226.

The macro merging feature 218 on the client system 206 preferably merges the global macros 226 with the local macros 216 in such a way that the local user's local macros 216 are preserved and given preference over the global macros 226. In one embodiment, the local preferences of the user are given greater priority (weight) than the global macros 226. In another embodiment, the macro merging feature 218 is adapted to blend and resolve conflicts between the local macros 216 and global macros 226. In this manner, each user's UI 208 generates and adopts efficiencies based on the user's interaction as well as efficiencies derived from global usage of the software application 204. Additionally, the light-weight data mining engine 214 can identify unused (or seldom used) UI components (such as buttons, menu items, and the like) through usage mining. These UI components can be removed from task bars and/or can be moved to remote areas to make room for more frequently used macros.

In general, both the lightweight data mining engine 214 and the global data mining engine 224 can be adapted to use any number of data mining techniques. Data mining refers to an analytical process designed to explore data (usually large amount of data) in search of consistent patterns and/or systematic relationships between variables, and then to validate the findings by applying directed patterns to new subsets of data. Typically, the ultimate goal of data mining is prediction. In this instance, the goal of data mining is to learn from, adapt to and/or predict usage patterns of the typical user of the software application 206 and to deploy macros and/or UI adjustments 226 that improve the user's efficiency and experience with the application 206.

In general, the data mining techniques can include anything from a choice of predictors for a statistical regression model to elaborate exploratory analyses using a wide variety of graphical and statistical methods, neural networks, fuzzy logic, artificial intelligence, and the like. In one embodiment, the light-weight data mining engine 216 utilizes an averaging algorithm for a regression-type statistical model with continuous dependent variables of interest (such as the user accessible features of the application). The algorithm can then weight a combination of predictions generated by the averaging algorithm. The weights can be generated using a boosting procedure for generating weights for weighted prediction. One implementation of the boosting algorithm assigns an equal weight to the usage data. Predicted classifications are then computed for the usage data, and weights are applied to the observations in the learning sample that are inversely proportional to the accuracy of the classification. In other words, greater weight is assigned to those observations that are difficult to classify, and lower weights are applied to those that are easier to classify. The classifier can then be applied again to the weighted data. During deployment, the predictions from the different classifiers can then be combined to derive a prediction or to derive UI adjustments and global macros 226, for example.

Other classification and/or statistical analysis techniques may also be used, depending on the specific application 206. In particular, the light-weight data mining engine 216 and the global data mining engine 226 utilize any number of data mining techniques to improve the efficiency of the application 206 based on the acquired usage information.

Preferably, the user is queried to opt in or opt out of the global data mining option during installation. If the user chooses not to participate, the light-weight data mining engine 216 still utilizes the local usage log 212 to update and to improve the UI 208 of the application 206 based on the user's interactions. However, global macros 226 would not be downloaded to the application 206 on the client system 202 unless the user downloaded them manually. The user may later change their mind and begin participating by simply changing their preferences or settings within the application 206. If the user opts in for participation in the global data mining process, the user's computer will periodically upload the usage data to the global usage log.

Figure 3:
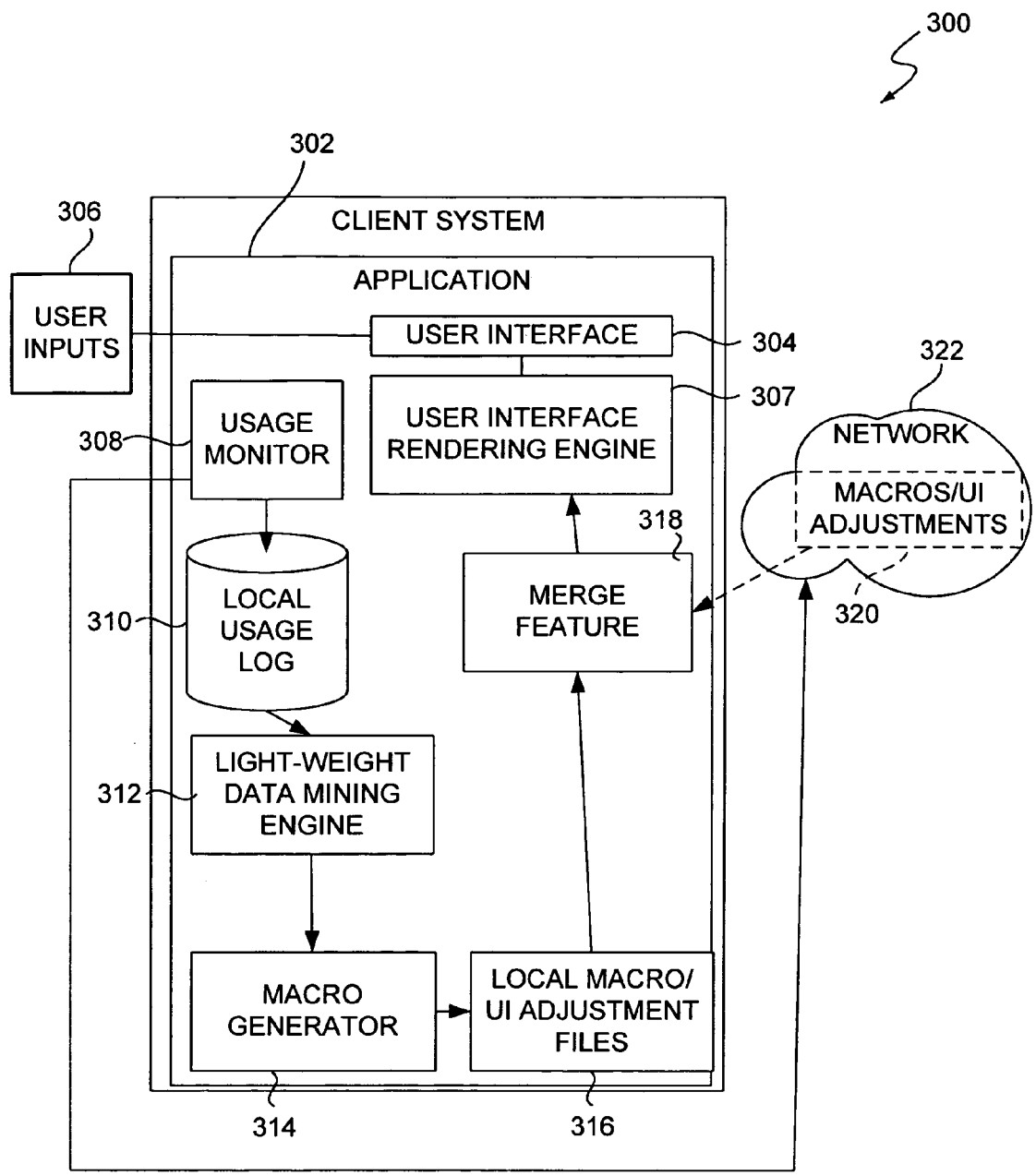
FIG. 3 is a simplified block diagram of a client system with a usage log and a light-weight data mining engine for adaptive modification of a user interface of a software application based on local operator usage data according to an embodiment of the present invention.

FIG. 3 is a simplified block diagram of a client system 300 adapted for dynamic modification of the UI based on usage according to an embodiment of the present invention. The client system 300 includes a software application 302 with a UI 304 for receiving user inputs 306 and with a UI rendering feature 307. The client system 300 also includes a usage monitoring feature 308, a local usage log 310, a lightweight data mining engine 312, a macro generator 314, a local macros file 316, and a macro merging feature 318. Generally, the monitoring feature 308 monitors user interactions (user inputs 306) with the UI 304 and logs the usage information in the local usage log 310. The usage information may simply be a count of a number of times a user accesses particular objects of the UI 304 or functional features of the application 302 through the UI 304.

The light-weight data mining engine 312 applies a desired algorithm to the usage data in the local usage log 310 to determine frequently accessed features and functions, patterns of use, and the like. The light-weight data mining engine 312 is then adapted to provide information derived from the local usage log 310 to the macro generator 314, which generates local macros and UI adjustments and stores them in the local macros/adjustments file. The macro merging feature 318 optionally merges local macros/UI adjustments with global macros 320 received from network 322 and provides the macros (local and/or global) to the UI rendering feature 307. The UI rendering feature 307 use the macro and/or adjustment information to adjust the ordering, arrangement and accessibility of functions within the application 302.

Figure 4:
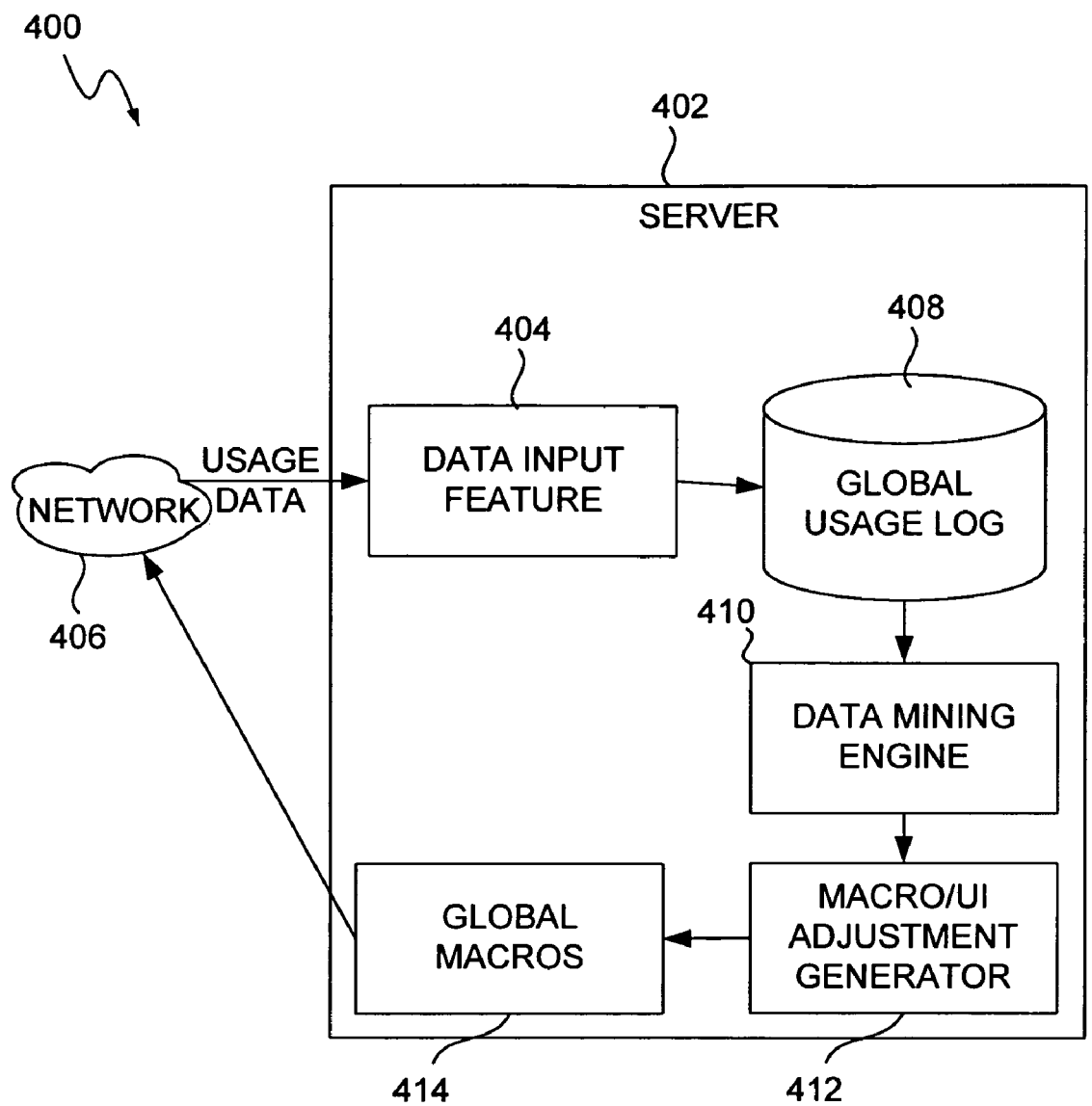
FIG. 4 is a simplified block diagram of a server having a usage data file and a data mining engine for adaptive modification of software applications based on global usage data according to an embodiment of the present invention.

FIG. 4 is a simplified block diagram of a system 400 adapted to collect usage data and generate global macros and/or adjustments according to an embodiment of the present invention. The system 400 includes a server 402 with a data input feature 404 adapted to receive usage data from a network 406, such as the Internet. The system 400 also includes a global usage log 408, a data mining engine 410, a macro/user interface (UI) adjustment generator 412, and a global macros file 414.

Generally, the data input feature 404 is adapted to receive usage data from a plurality of client systems over the network 406. The received usage data is then stored in the global usage log 408. The data mining engine 410 periodically or continuously processes the stored usage data using one or more data mining algorithms. The data mining engine 410 then passes the resulting usage information to a macro generator/UI generator 412, which generates user interface adjustments and global macros, which can be stored in a global macros file 414. The user interface adjustments can include, for example, ordering and arrangement of menus and menu items, arrangement of user selection items within the UI (which provide access to functions and features of the software application), and the like. Global macros can include sets of mouse clicks, sets of user selections, and the like, which can be used to access functionality within the software application using a single click rather than the string of user selections.

The global macros 414 can then be downloaded to each of the plurality of client systems for integration (merging) into the individual application instances. Preferably, the global macros 414 are weighted with a lower priority than local usage data, to allow the client system to be adjusted for the particular operator, while still providing global improvements to the application on the client system.

Figure 5:
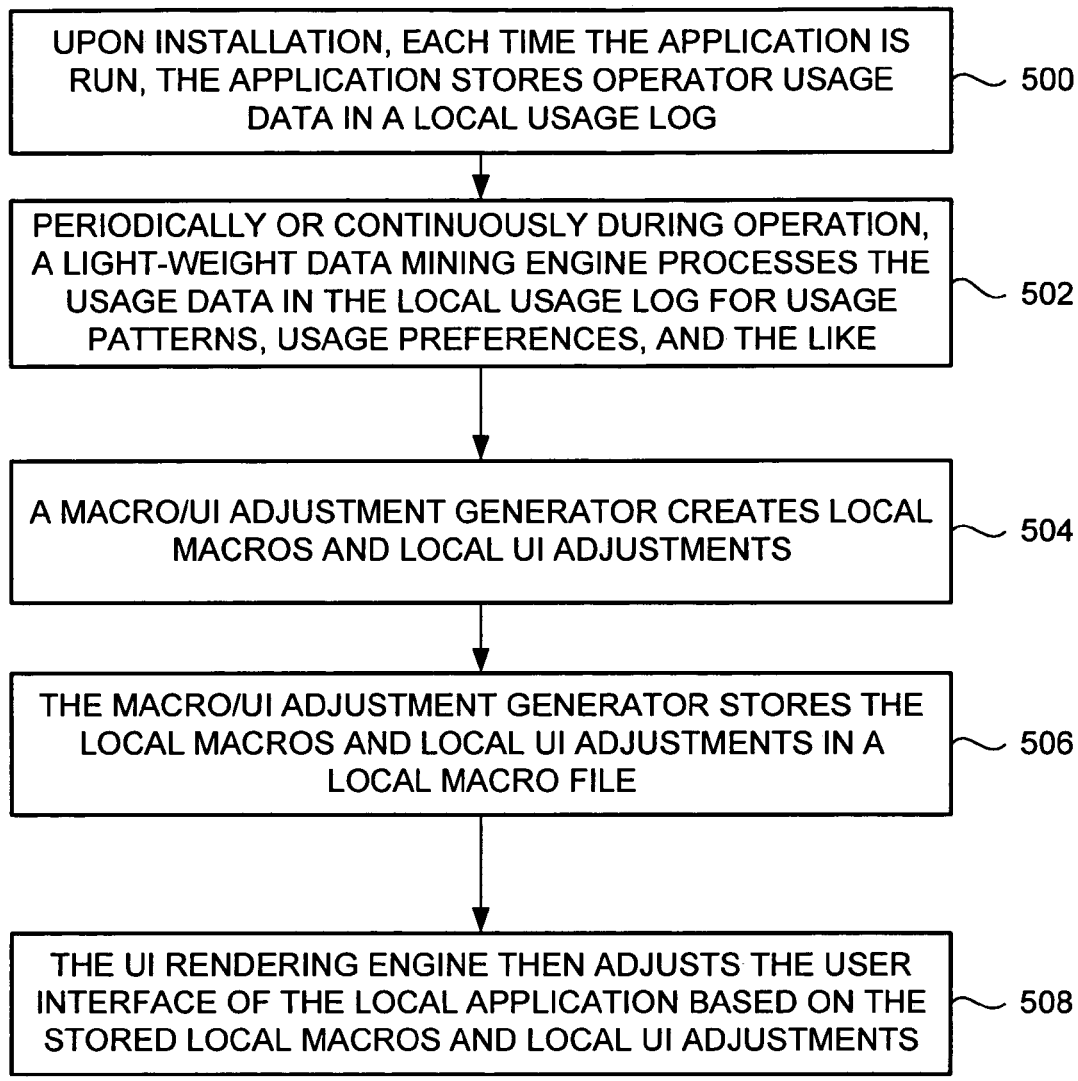
FIG. 5 is a simplified flow diagram of a process for collecting and mining data locally on a client system.

FIG. 5 is a simplified flow diagram of a process for collecting and mining data locally on a client system. Upon installation, each time the application is run, the application stores operator usage data in a local usage log (step 500). Periodically or continuously during operation, a light-weight data mining engine processes the usage data in the local usage log for usage patterns, usage preferences, and the like (step 502). A macro/UI adjustment generator creates local macros and local UI adjustments (step 504) and stores them in a local macro file (step 506). The UI rendering engine then adjusts the user interface of the local application based on the local macros and local UI adjustments (step 508).

Figure 6:
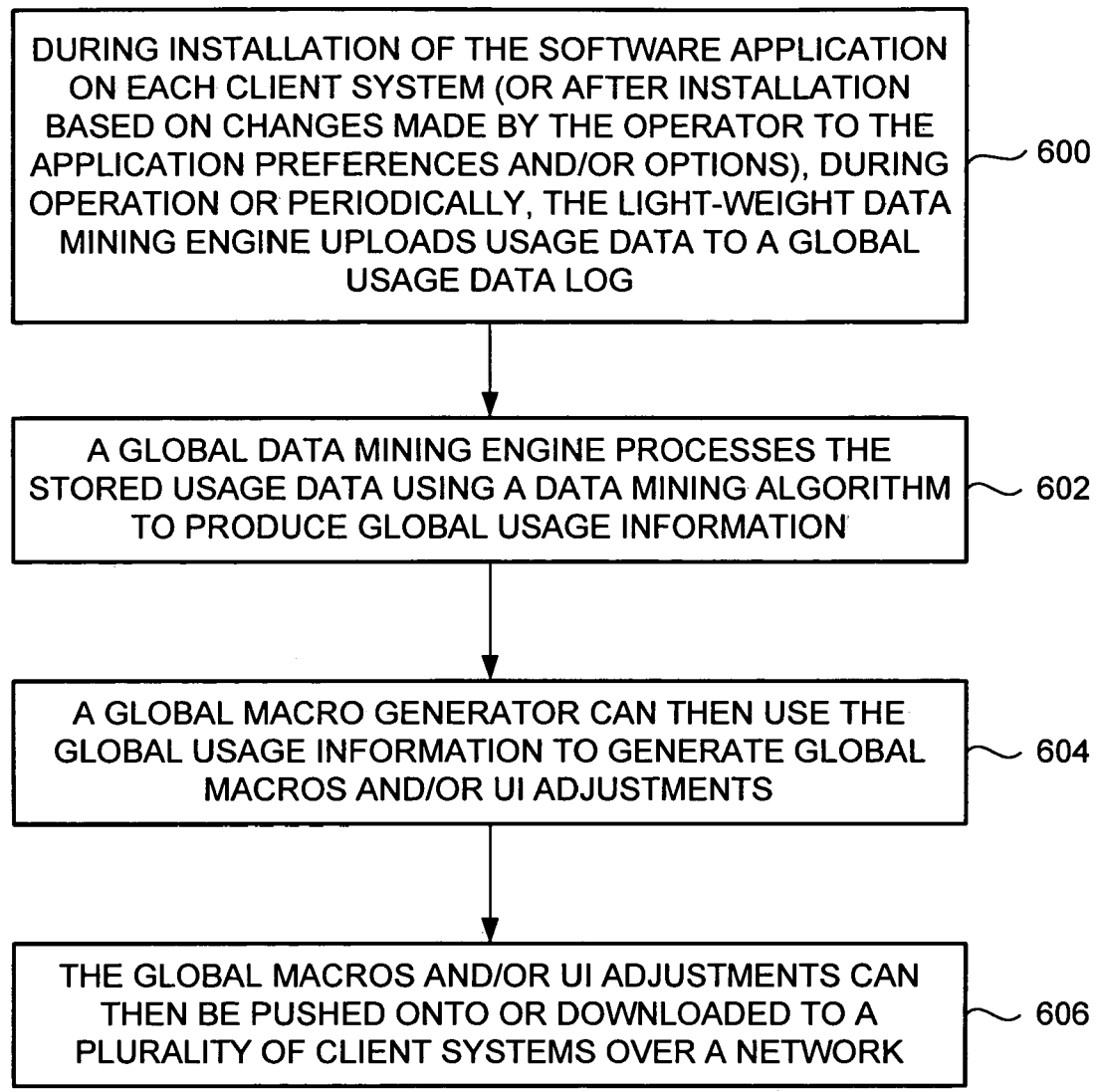
FIG. 6 is a simplified flow diagram of a process for collecting global usage data and mining the data for global usage information according to an embodiment of the present invention.

FIG. 6 is a simplified flow diagram of a process for collecting global usage data and mining the data for global usage information according to an embodiment of the present invention. During installation of the software application on each client system (or after installation based on changes made by the operator to the application preferences and/or options), during operation or periodically, the light-weight data mining engine uploads usage data to a global usage data log (step 600). A global data mining engine processes the stored usage data using a data mining algorithm to produce global usage information (step 602). The global usage information can include, for example, a frequency with which particular application features are accessed, and the like. A global macro generator can then use the global usage information to generate global macros and/or UI adjustments (step 604). The global macros and/or UI adjustments can then be pushed onto or downloaded to a plurality of client systems over a network (step 606).

Figure 7:
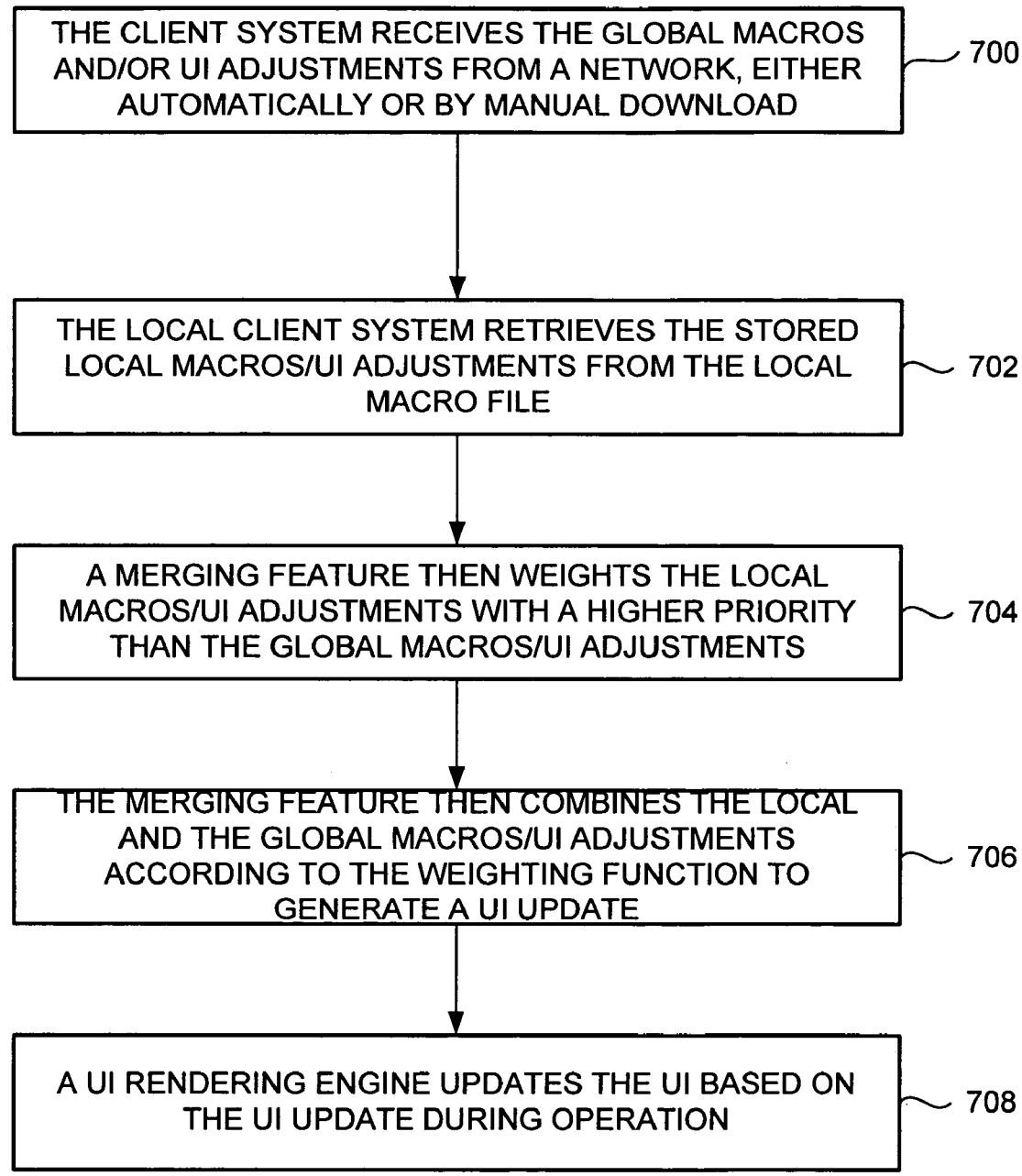
FIG. 7 is a simplified flow diagram of a process for merging global and local usage data within a client system according to an embodiment of the present invention.

FIG. 7 is a simplified flow diagram of a process for merging global and local usage data within a client system according to an embodiment of the present invention. The client system receives the global macros and/or UI adjustments from a network, either automatically or by manual download (step 700). The local client system retrieves the stored local macros/UI adjustments from the local macro file (step 702). A merging feature then weights the local macros/UI adjustments with a higher priority than the global macros/UI adjustments (step 704). The merging feature then combines the local and the global macros/UI adjustments according to the weighting function to generate a UI update (step 706). Finally, a UI rendering engine updates the UI based on the UI update during operation (step 708).

It should be understood that, in certain instances, the various features and functions called out in the figures can be combined. For example, the data mining engine can be combined with the macro generation feature and/or the merging feature.

In general, the systems and methods of the present invention provide advantages over conventional systems in that both local and global usage information can be used to update the design and layout of the software application. The mining engine analyzes what most operators use most often and least often. Frequently used items should be easy to find and to execute, while rarely used items should yield space for the more frequently used items.

In one embodiment, if the user opts to participate in the global usage logging process, the developer of the software may be given access to the general usage information, in order to improve subsequent versions of the software to be more user friendly and accessible.

Although the present invention has been described with reference to particular embodiments, workers skilled in the art will recognize that changes may be made in form and detail without departing from the spirit and scope of the invention.

What is claimed is:

1. A system for dynamically updating user accessible features of a software application on a given client computer, the system comprising:
    a user interface at the given client computer receiving operator inputs to the software application;
    a local usage data file storing usage information on a computer storage media corresponding to the operator inputs;
    a data mining engine processing the stored usage information retrieved from the computer storage media and generating and storing information indicative of at least one local user interface adjustment of the software application based on processed usage information, wherein a user interface adjustment indicates an adjustment to the presentation of information by a user interface; and
    a local merging feature blending and resolving conflicts between local user interface adjustments and global user interface adjustments generated and stored at a remote server, the global user interface adjustments based at least in part on operator usage patterns on client computers other than the given client computer, to generate and store an interface update for the user interface of the application on the given client computer based on each of the local user interface adjustments and global user interface adjustments.

2. The system of claim 1 further comprising:
    a server receiving usage data from a plurality of application instances on a plurality of client computers and storing the received usage data in a global usage log; and
    a global data mining engine processing the stored usage data and periodically generating global user interface adjustments based on the stored usage data for updating the user interface of each of the plurality of application instances.

3. The system of claim 1 wherein the data mining engine is analyzes the usage data according to a predetermined data mining algorithm.

4. The system of claim 1 wherein the interface update comprises:
    a macro for minimizing steps required of an operator to perform an operation within the user interface of the application.

5. The system of claim 1 wherein the data mining engine provides usage information to a server over a network based on an operator selection.

6. A system for updating a user interface of a software application based on global usage data, the system comprising:
    a server coupled to a network and receiving usage information over the network based on operator interactions with the user interface of each of a plurality of application instances of the software application;
    a global usage log for storing the received usage information on a computer storage medium at the server;
    a data mining engine at the server processing the stored usage information in the global usage log, the stored usage information being used to generate and store least one global user interface adjustment at the server of each of the plurality of application instances based on the stored usage information, wherein a user interface adjustment indicates an adjustment to the presentation of information by a user interface; and
    a client device resolving conflicts between global user interface adjustments and local user interface adjustments, merging the global user interface adjustments based at least in part on operator usage patterns of the software application on devices other than the client device and local user interface adjustments into an interface adjustment and updating the user interface based on the interface adjustment.

7. The system of claim 6 wherein the client device is coupled to the server over the network, the client device having an application instance of the software application, the client device storing usage information corresponding to operator interactions with the user interface of the software application in a local usage log and in the global usage log, the client device processing the data in the local usage log and to generating local user interface adjustments to the user interface based on the operator inputs.

8. The system of claim 7 wherein the interface adjustment comprises a macro that minimizes a number of steps required of a user to execute a function within the user interface.

9. The system of claim 7 wherein the data mining engine processes and analyzes the global usage data using a data mining algorithm.

10. The system of claim 7 further comprising:
    a global macros data file stored on the server, the global macros data file comprising a plurality of global user interface adjustments.

11. The system of claim 10 wherein the global macros data file is accessible for download to each of the plurality of application instances of the software application based on operator interactions with the user interface.

12. A system for dynamically improving a user interface of a software application comprising:
    client devices coupled to a network and operating software programs, each client device having a software application stored on a computer storage media with a user interface, the software application recording operator interactions with the user interface and optionally generating a usage output based on the recorded operator interactions, wherein each client device generates local adjustments to the representation of information by the user interface based on the recorded operator interactions;
    a server coupled to each of the client devices over the network and receiving the usage output from the client devices, wherein the server processes the received usage output and automatically generates global updates indicating an adjustment to the representation of information by the user interface based on the received usage output from a plurality of client devices; and
    a merge feature on each client device receiving the global updates, resolving conflicts between the global updates and the local adjustments and merging the global updates with the local adjustments to update the user interface.

13. The system of claim 12 wherein each client device comprises:

a local data mining engine processing the recorded operator interactions to identify patterns and frequently used features of the user interface.

14. The system of claim 13 wherein each client device further comprises:
a macro generator generating macros and user interface adjustments based on the identified patterns and frequently used features.

15. The system of claim 12 wherein the server comprises:
a global data mining engine processing the received usage output and generating global updates to the user interface.

16. The system of claim 15 wherein the server further comprises:
a global macros file storing the global updates.

17. The system of claim 16 wherein the global macros file is accessible for download to each client device over the network based on operator interactions with the user interface.

18. The system of claim 12 wherein the merge feature blends and resolves conflicts between local adjustments and global updates to update the user interface.

* * * * *